United States Patent [19]

Herrmann

[11] Patent Number: 4,537,559
[45] Date of Patent: Aug. 27, 1985

[54] VENTURI ROTOR APPARATUS FOR THE GENERATION OF POWER

[75] Inventor: Christian W. Herrmann, 515 E. 35th St., Joplin, Mo. 64801

[73] Assignees: Christian W. Herrmann; Anna Herrmann, both of Joplin, Mo.

[21] Appl. No.: 535,099

[22] Filed: Sep. 23, 1983

[51] Int. Cl.$^3$ .............................................. F03D 3/06
[52] U.S. Cl. ................................ 416/119; 416/197 A; 416/DIG. 8
[58] Field of Search ............. 416/197 A, DIG. 8, 119

[56] References Cited

U.S. PATENT DOCUMENTS

| | | | |
|---|---|---|---|
| 4,004,861 | 1/1977 | Soules | 416/119 X |
| 4,015,911 | 4/1977 | Darvishian | 416/119 |
| 4,037,989 | 7/1977 | Huther | 416/197 A |
| 4,048,947 | 9/1977 | Sicard | 416/119 X |
| 4,209,281 | 6/1980 | Edmunds | 416/197 A |
| 4,490,623 | 12/1984 | Goedecke | 416/197 A X |

FOREIGN PATENT DOCUMENTS

| | | | |
|---|---|---|---|
| 1045038 | 12/1978 | Canada | 416/DIG. 8 |
| 860930 | 12/1952 | Fed. Rep. of Germany | 416/119 |
| 2051579 | 4/1972 | Fed. Rep. of Germany | 416/DIG. 8 |
| 3003270 | 8/1981 | Fed. Rep. of Germany | 416/DIG. 8 |
| 502616 | 5/1920 | France | 416/DIG. 8 |
| 929721 | 1/1948 | France | 416/DIG. 8 |

Primary Examiner—Everette A. Powell, Jr.
Attorney, Agent, or Firm—Armstrong, Nikaido, Marmelstein & Kubovcik

[57] ABSTRACT

The present invention is directed to a venturi rotor apparatus for producing power from the rotation thereof. The apparatus comprises a support and a central core having a spherical triangular cross-section mounted on the support for rotation about a central axis through the core. A plurality of support arms, fixed to the central core, extend radially outward therefrom at the verticies of the spherical triangle. At least three airfoils are fixed to a radially extended portion of the support arms such that a gap is formed between the surface of the central core and the surface of the airfoils, with the airfoils being aligned on an axis parallel to the axis of the central core. Fluid flow, such as air flow, having at least a component in the direction perpendicular to the axis of the central core flows through the gap producing a venturi effect for enhancing the movement of the airfoils about the axis of the central core. The movement of the airfoils applies torque to the central core through the support arms to thereby rotate the central core. The central core includes an output which rotates with the central core and which can be used as a power takeoff from the rotating central core.

15 Claims, 8 Drawing Figures

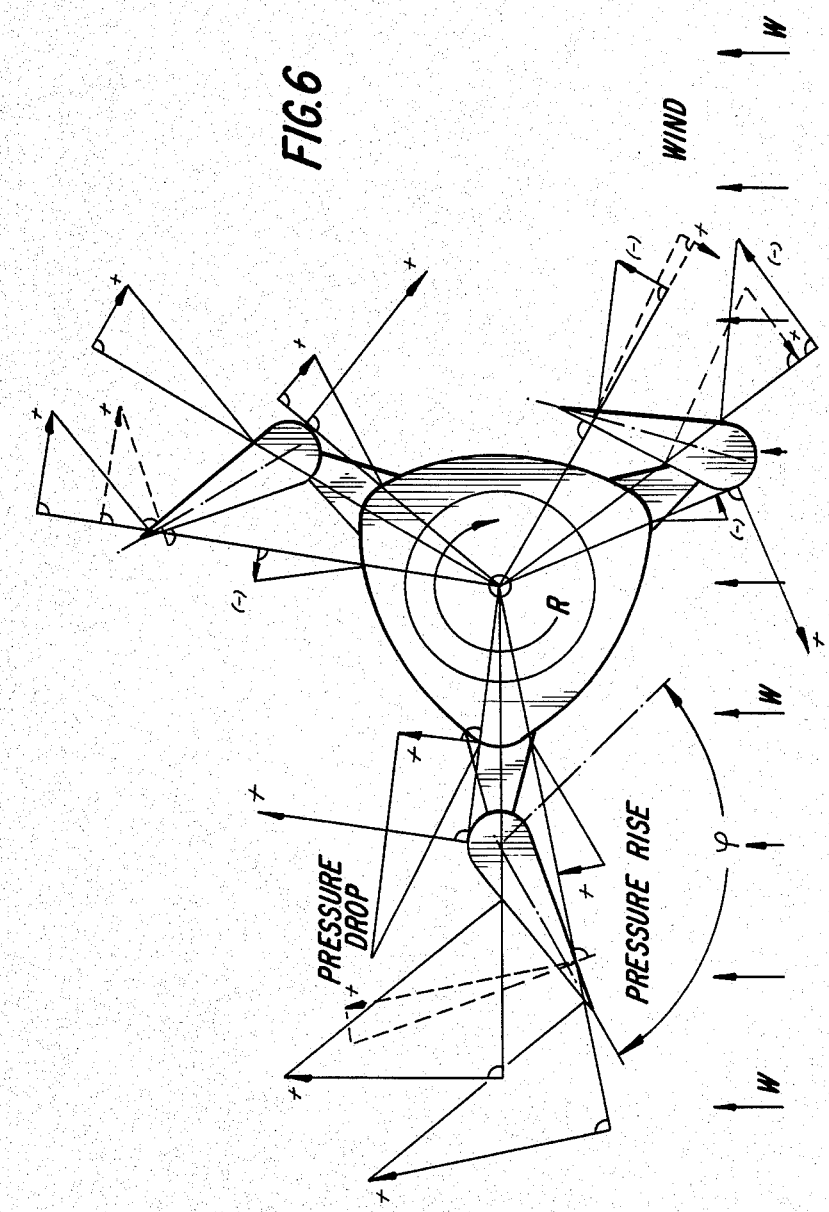

4,537,559

VENTURI ROTOR APPARATUS FOR THE GENERATION OF POWER

BACKGROUND OF THE INVENTION

1. Field of the Invention

The present invention is directed to a vertically oriented venturi rotor apparatus and more particularly, to a venturi rotor apparatus which comprises a vertically oriented rotatable central spoiler core having a arcuate-triangular cross-section and three airfoils mounted on support arms extending from the verticies of the arcuate triangle. The airfoil and central core are positioned with respect to each other such that there is a gap therebetween. The gap produces a venturi effect when air flows through the gap. Air flow around the structure and through the gap causes the movement of the airfoils which apply torque to the core through the support arms which rotates the core and the rotating of the core is used to generate power through a suitable power transmission. The power generated by the venturi rotor structure may thus be supplied to an electrical generator, pump, ships screw or any other device requiring a mechanical power input.

2. Description of the Prior Art

Devices such as windmills are known which use air flow for the generation of power. Prior art windmills generally have a propeller type of structure having a plurality of blades or vanes which extend radially outward in a plane which is substantially perpendicular to the direction of air flow. Vertically oriented prior art devices, of this type, generally use Darrius or Davonius type rotors. The force of the air against the blades or vanes causes them to rotate and this rotation can be used through a mechanical coupling to provide a power output.

Prior art devices of this type have the disadvantage that they do not efficiently generate power and during periods of low velocity air flow, they may not be able to provide sufficient power for any practical use whatsoever. In high velocity winds, these prior art devices do not operate because of turbulence created by the high velocity air. The primary disadvantage of this prior art type of windmill is that there is a physical limitation on the blade speed above which the machine will destroy itself. Furthermore, the dynamic capture area of the air flow is equivalent to the geometric capture area and, therefore, there is no enhancement of air mass flow through the device. Still further, these devices are very noisy as a result of blade-wind interference.

Another prior art type device for using wind to generate power is a streaming divider with a central core. Stream dividing is a different principle than stream collecting used in the present invention. Devices of this type are described in German Pat. Nos. DE 30 03 270 C2 and DE-PS 604 333. The device disclosed in DE-PS No. 604 333 has a fixed central core and a plurality of blades surrounding the core. The air flow through the device produces only lift forces and, therefore, the device is inefficient. The device disclosed in DE No. 30 03 270 C2 has a rotatable core and two airfoils. Air flowing into the device is divided with most of the air following the path of least resistance. This air flow produces a low pressure in certain rear areas of the device which results in a lift force being applied to one of the airfoils. This lift force causes the rotation of the rotor and thereby the core.

SUMMARY OF THE INVENTION

It is the primary object of the present invention to provide a venturi rotor apparatus which is simple in structure and which is effecient in the generation of power.

It is another object of the present invention to provide a venturi rotor apparatus which has a structure which permits it to utilize the venturi effect to enhance the efficiency of operation and the power output of the apparatus.

It is a further object of the present invention to provide a venturi rotor apparatus which can operate under an extremely wide range of wind conditions including a wide range of wind speeds and wind from any direction.

It is still another object of the present invention to provide a venturi rotor apparatus which is simple in construction, highly reliable, and which requires minimal maintenance.

The present invention is directed to a venturi rotor apparatus for producing power from the rotation thereof. The apparatus comprises a support means and a central core means having an arcuate triangular cross-section mounted on the support means for rotation about a central axis through the core means. A plurality of support arms, fixed to the central core means, extend radially outward therefrom at the verticies of the arcuate triangle. At least three airfoil means are fixed to a radially extended portion of the support arms such that a gap is formed between the surface of the central core means and the surface of the airfoil means, with the airfoil means being aligned on an axis parallel to the axis of the central core means. Fluid flow, such as air flow, having at least a component in the direction perpendicular to the axis of the central core means flows through the gap producing a venturi effect for enhancing the movement of the airfoil means about the axis of the central core means. The movement of the airfoil means applies torque to the central core means through the support arms to thereby rotate the central core means. The central core means includes an output means which rotates with the central core means and which can be used as a power takeoff from the rotating central core means.

The airfoil means can be either fixedly mounted or pivotally mounted on the support arms. Further, the venturi rotor can be vertically oriented so that it will be rotated in response to wind from any direction. Still further, the central core means and the airfoil means can be made from a plurality of modular units to provide for the simple construction of devices of various sizes.

BRIEF DESCRIPTION OF THE DRAWINGS

FIG. 6 is a force diagram of the alternative embodiment using the airfoil of FIG. 5A showing the forces acting on the venturi rotor of the present invention.

DETAILED DESCRIPTION OF THE PREFERRED EMBODIMENTS

Figure 1:
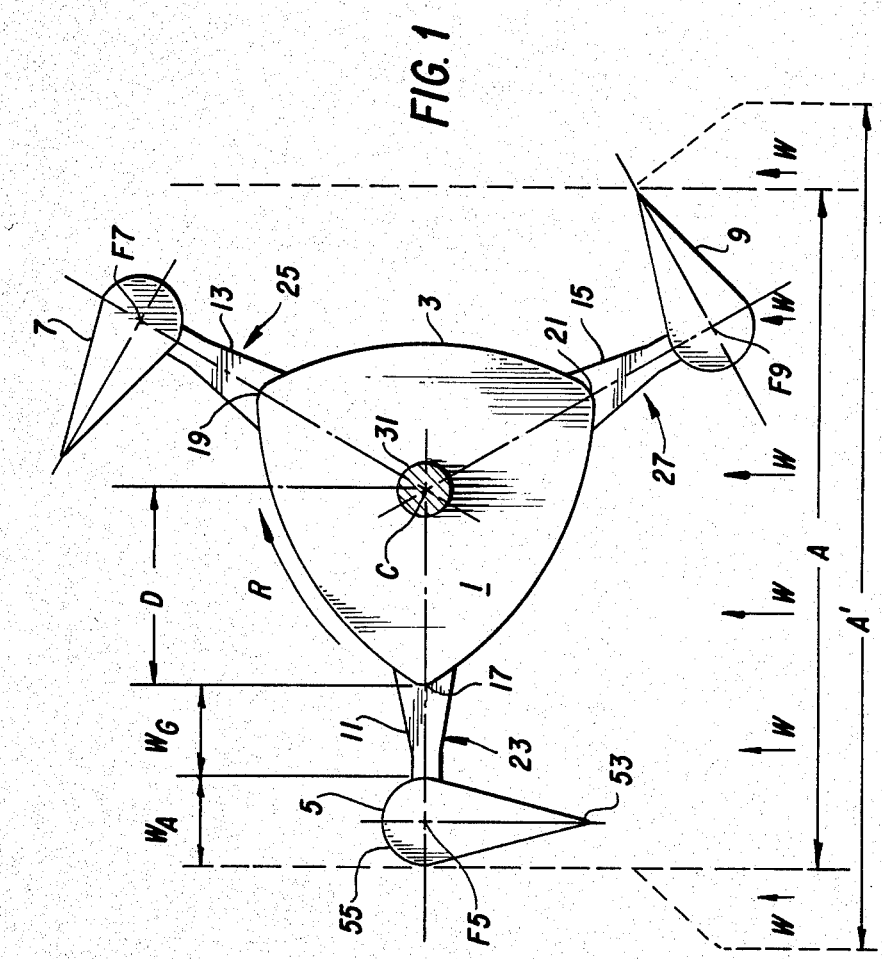
FIG. 1 is a plan view of a venturi rotor of the present invention.

Referring to the drawings, the venturi rotor structure of the present invention is vertically oriented and comprises a rotatable central spoiler core 1 which has an arcuate triangular cross-section 3. Three airfoils 5, 7 and 9 are fixed to the central core 1 by means of support arms 11, 11', 13, 13' and 15, 15'. The support arms extend radially outward from the central core 1 at the verticies 17, 19 and 21 of the arcuate triangle 3. Gaps 23, 25 and 27 are formed between the verticies of the central core 3 and the airfoils 5, 7 and 9.

The shaft 31, which is part of the central core structure, extends along the central axis C of the central core 1. The rotation of the central core 1 rotates the shaft 31, which provides a power output through transmission 33, which is supported on a base 35. The transmission 33 could be a gear transmission, belt transmission, hydraulic transmission, or any other suitable means for producing a power takeoff from a rotating shaft. The axes F5, F7, and F9 of the airfoils 5, 7 and 9, are parallel to the axis C of the central core.

The venturi rotor structure is supported by support posts 37, 34 and at least one additional post (not shown), which are connected to the central core by means of a superstructure 41. The central core 1 rotatably held and supported by the superstructure. Guy wires may also be used in lieu of or in conjunction with the support posts for providing a stable support structure for the apparatus.

Figure 3:
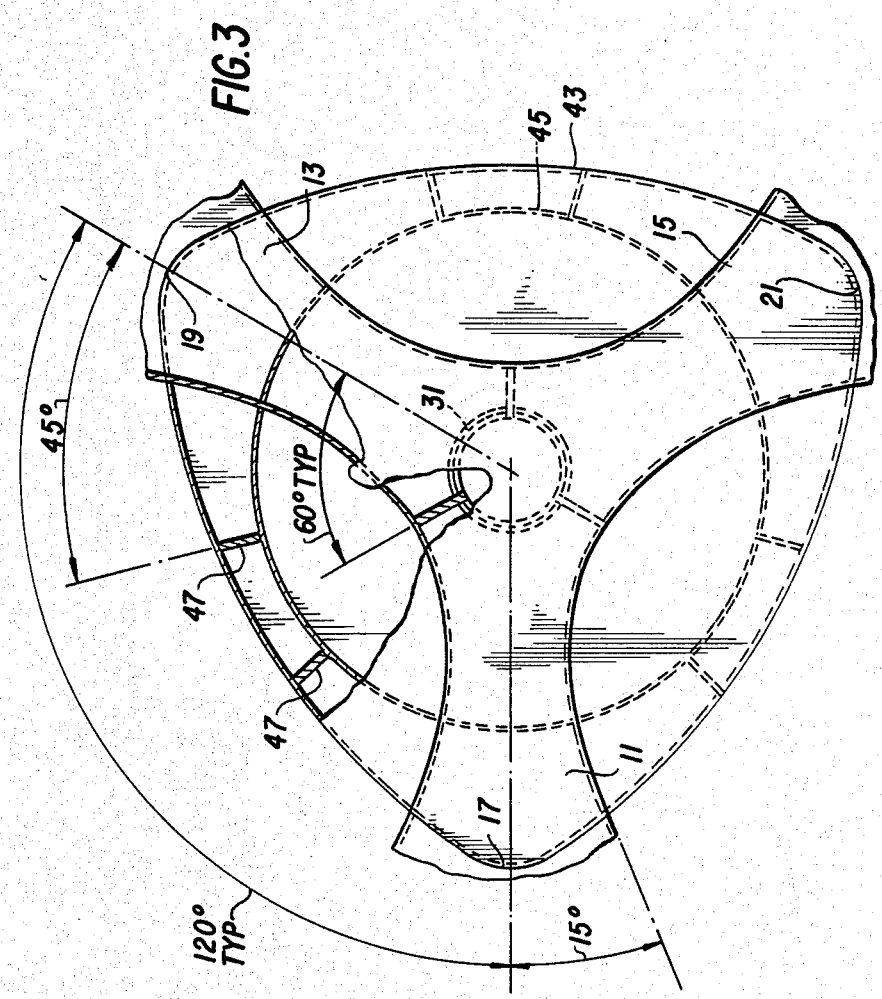
FIG. 3 is a cross-sectional view of the central core of the preferred embodiment of the present invention.

Referring to FIG. 3, the central core structure 1 has an outer portion 43 having an arcuate-triangular cross-section and an inner portion 45 having a circular cross-section. The inner and outer portions are rigidly connected together by means of a plurality of ribs 47. The interconnected inner and outer core structure, provides a strong, rigid, lightweight central core. The inner and outer cores are connected to the central shaft 31 by means of an interconnecting structure 49.

Figure 4:
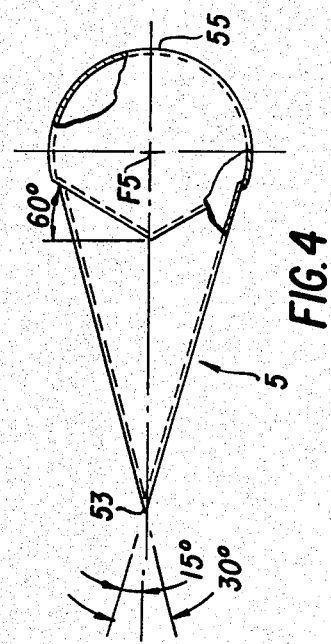
FIG. 4 is a cross-sectional view of an airfoil of the preferred embodiment of the present invention.

Referring to FIG. 4, the airfoils 5, 7 and 9 each having a trailing knife edge 53 and a leading wide edge 55, which is circular in cross-section. The terms trailing and leading are with respect to the direction of rotation of the rotor. The maximum width of each airfoil $w_A$ is approximately equal to the width of the gap wG between the airfoil and the central core. Further, the width of the gap and the maximum width of each airfoil, wA+wG, is equal to the distance D from the central axis C of the central core to the verticies of the central core. In the preferred embodiment, the verticies of the central core are slightly rounded with respect to the actual geometric verticies. There is thus, a small variation in the distances as shown in the drawings because of this difference. Further, the distance from the axis of each airfoil to its leading edge is such that a line L extending between the leading edge and the adjacent vertex of the central core is parallel to the line M between the axis C and the axis of the airfoil.

With reference to FIG. 1, in operation, the core 1 functions as a barrier to the wind stream W directed toward the venturi rotor causing the rotor to rotate in the direction of arrow R. The central core 1 thus directs the air in the capture area A' towards the airfoil and into the gap 23 between the airfoil 5 and the core 1. The flow of air through the gap 23 produces a venturi effect and the directing of the air flow in this manner results in a combination of effects which enhance the rotation of the venturi rotor, thereby producing a simple and efficient generation of power.

The directing of the air flow against the airfoil 5 produces a high pressure or drag on the side surface 5a of the airfoil 5 which pushes the airfoil in the direction of the wind, thereby producing a torque on the central core 1 through the support arm 11. The torque rotates the central core 1. Simultaneously, air flow through the gap 23 has a venturi effect. This venturi effect cause an increase in air velocity through the gap which results in a substantial increase in the dynamic pressure in the area adjacent the gap and a very substantial decrease in the static pressure in this area. Dynamic pressure results in forces in the direction of flow and static pressure results in forces perpendicular to the direction of flow. The venturi effect thus creates a very low static pressure on the rear or downwind side of the central core 1 and on the opposite or leading edge 55 of the airfoil 5. Thus, very low static pressure produces a lift effect which sucks or pulls the airfoil 5 and the core 1 in the direction of rotation resulting in additional torque being applied to the core 1, thereby enhancing the rotation of the core.

The venturi effect of the gap 23 causes an increase in the velocity of air flow through the gap and a decrease in pressure in and behind or downwind of the gap 23. The air flow through the gap 23 is thus enhanced first, due to the barrier effect of the central core 1 and secondly, due to the air flowing from the high pressure front side to the low pressure rear side.

The kinetic energy transferred from the air flow to the venturi rotor is a function of the mass of air flow in accordance with the equation $$P = \tfrac{1}{2}mv_2$$

where:
P=power
m=mass of air
v=velocity of air flow

As can be seen from the above equation, the power can be increased by increasing the mass of air flow. The mass of air flow can be increased by an increase in the capture area of the venturi rotor. In the apparatus of the present invention, the low pressure area in the gap 23 and behind the central core 1 and the airfoil 5 caused by the venturi effect expands the dynamic capture area A' so that it is significantly larger than the geometric capture area A because the low pressure in effect, sucks air from beyond the geometric capture A in order to fill the low pressure areas behind the venturi gap.

In the positioning of the airfoils with respect to the wind direction as shown in FIG. 1, the forces due to lift and drag on each of the airfoils 7 and 9 are such that the resultant force on each of the airfoils is negligable with respect to the forces on airfoil 5. Thus, with the airfoils in the position shown in FIG. 1, the torque for rotating the central core 1 is produced as a result of the various forces on the airfoil 5 alone without any substantial contribution or degradation due to airfoils 7 and 9.

As the venturi rotor structure rotates, the various drag and lift forces as well as the areas of high and low pressure around the surfaces of the airfoils and central core is constantly changing. However, the resultant forces on the structure itself, which cause the rotation, remain relatively constant.

Figure 5C:
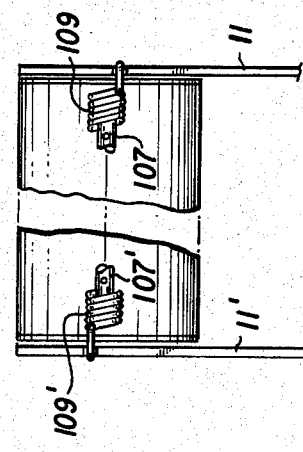
FIGS. 5A, 5B and 5C, illustrate an airfoil of an alternative embodiment of the present invention.
Figure 5B:
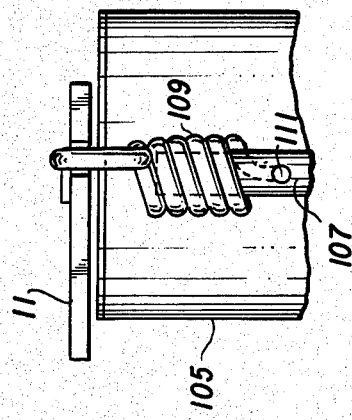
Figure 5A:
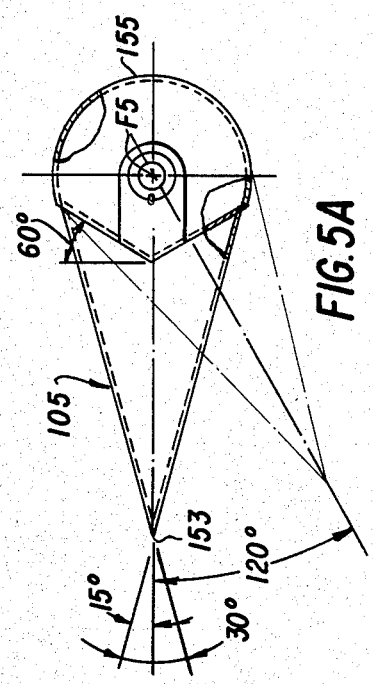

FIGS. 5A and 5B illustrate an alternative embodiment of the present invention in which the airfoils are pivotally mounted on the support arms. Referring to FIGS. 5A and 5B, the airfoil 105 is mounted on the support arms 11 and 11' by means of a rotatable shaft 107. A spring 109 is connected to the shaft 107 through a hole 111 and engages the arm 11 to bias the trailing edge 53 of the airfoil in a direction towards the central core. As the apparatus rotates, centrifugal force tends to push the leading edge of the airfoil away from the central core. The centrifugal force is counteracted at least to some extent by the biasing force of the spring to thereby optimize the airfoil orientation. Means such as stops, can be provided for limiting the pivotal movement of the airfoil with respect to the arms. Preferably, total movement should be limited to 120'.

This embodiment is very effective in environments where wind speed is relatively constant because the spring constant can be selected for a particular angular speed. If there is a large variance in wind speed, then the fixed airfoil embodiment is more effective. Other techniques for adjusting the orientation of the air foil can also be used.

Figure 2:
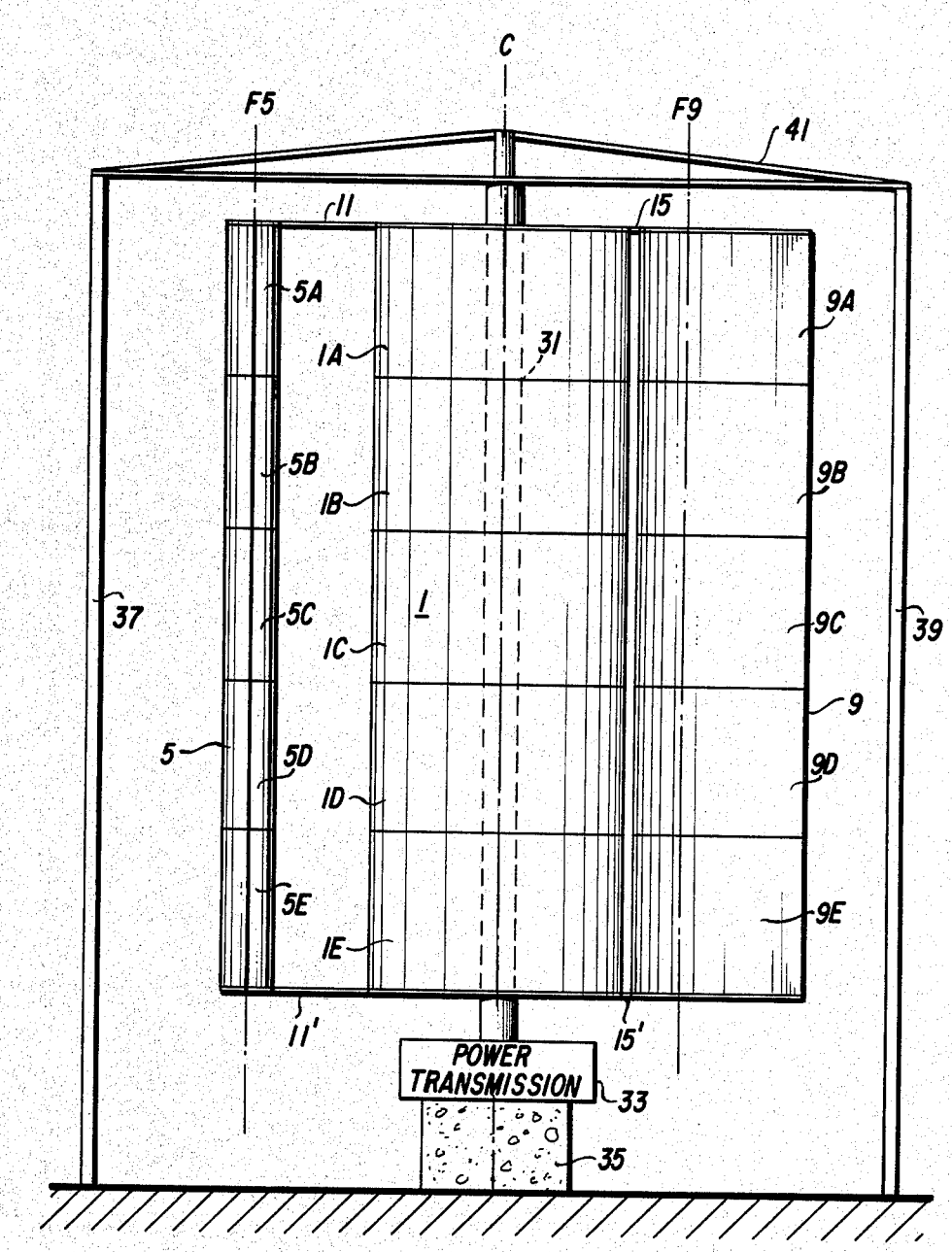
FIG. 2 is a front view of a venturi rotor of the present invention.

The central core 1 and/or the airfoils 5, 7 and 9 may be constructed as unitary structures or maybe made of a plurality of modular units rigidly fastened together. Referring to FIG. 2, the central core 1 is formed of a plurality of modular units 1A . . . 1E, which are rigidly fastened together by any suitable means such as welding, bolting, riveting, etc. Further, the airfoils 5 and 9 are also constructed of a plurality of modular units 5A . . . 5E and 9A . . . 9E. These units are also rigidly fastened together by any suitable means. The advantage of the modular construction is that it enables an apparatus of any size to be easily constructed using standard modules. This permits greater flexibility in the manufacture and construction of the apparatus.

In selecting the materials for the central core and airfoils, a material should be chosen which has a high strength so that the apparatus can withstand high wind speeds. Furthermore, the material should be lightweight in order to minimize the centrifugal force resulting from the rotation of the apparatus.

FIG. 6 is a force diagram illustrating the forces on the venturi rotor of the present invention as a result of air flow or wind W. As is readily apparent the forces (+) in the direction of rotation greatly exceed the forces (−) in the direction opposite to the direction of rotation. The forces in the direction of rotation will always be greater than the forces in the opposite direction regardless of the direction of the wind or the position of the rotor.

Although in the preferred embodiment, the apparatus is disclosed as being driven by air flow caused by wind, it can be seen that the structure can be used with any type of fluid flow, either gaseous or liquid.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A venturi rotor apparatus for producing power from the rotation thereof, said apparatus comprising:
    (a) support means;
    (b) a central core means having an outer surface with verticies thereon, mounted on said support means for rotation about a central axis through said core means;
    (c) a plurality of support arms fixed to said central core means and extending radially outward therefrom; and
    (d) at least three airfoil means each airfoil means having leading and trailing edges, with respect to the direction of rotation, wherein said leading edge is arcuate and wider than said trailing edge, and side surfaces extending between the ends of the leading edge and the trailing edge, said airfoil means being fixed to a radially extended portion of said support arms, and wherein the junction of said side surfaces and ends of said leading edge of each airfoil means is positioned on a radial line extending from the center of the central axis of the center core means through a corresponding vertex of the outer surface, and wherein a gap is formed between the surface of said central core means and the junction of one of said side surfaces and the end of said leading edge of each of said airfoil means, each of said airfoil means being aligned on an axis parallel to the axis of said central core means, such that fluid flow having at least a component in a direction perpendicular to the axis of said central core means, flows through at least one of said gaps producing a venturi effect for enhancing the movement of said airfoil means about the axis of said central core means, the movement of said airfoil means applying torque to said central core means through said support arms to thereby rotate said central core means.

2. A venturi rotor apparatus as set forth in claim 1, wherein said central core means has a spherical-triangular cross-section, said support arms radially extending from the verticies thereof.

3. A venturi rotor apparatus as set forth in claim 2, wherein said central core means has an inner, circular cross-section, said inner portions and outer surface being rigidly connected together.

4. A venturi rotor apparatus as set forth in claim 1, wherein said trailing edge of said airfoil means is knife edge.

5. A venturi rotor apparatus as set forth in claim 4, wherein said leading edge of said airfoil means is an arc of a circle.

6. A venturi rotor apparatus as set forth in claim 1, wherein said leading edge of said airfoil means is an arc of a circle.

7. A venturi rotor apparatus as set forth in claim 1, wherein said support arms extend from both ends of said central core means.

8. A venturi rotor apparatus as set forth in claim 1, wherein the central axis of said central core means is vertical.

9. A venturi rotor apparatus as set forth in claim 2, wherein the width of each said gap is substantially equal to the maximum width of each said airfoil means.

10. A venturi rotor apparatus as set forth in claim 2, wherein the width of said gap and the maximum width of each said airfoil means is equal to the distance from the central axis to the verticies of said airfoil means.

11. A venturi rotor apparatus as set forth in claim 2, wherein a line from said trailing edge of one of said airfoil means to the adjacent vertex of said central core means is parallel to a line from the central axis of said central core means to the axis of said airfoil means.

12. A venturi rotor apparatus as set forth in claim 1, wherein each said airfoil means is pivotally mounted on said support arms.

13. A venturi rotor apparatus as set forth in claim 12, wherein each said airfoil means includes means for biasing said airfoil means against centrifugal force resulting from the rotation of said apparatus.

14. A venturi rotor apparatus as set forth in claim 13, wherein said central core means comprises a plurality of modular units rigidly coupled together and wherein each said airfoil means includes a plurality of modular units rigidly coupled together.

15. A venturi rotor apparatus as set forth in claim 1, wherein said central core means includes a shaft means extending therefrom for providing as power output for said venturi rotor apparatus.

* * * * *